Aug. 26, 1952 J. R. SHONNARD ET AL 2,608,103
WORM GEAR DRIVE
Filed Jan. 28, 1949
Fig 1
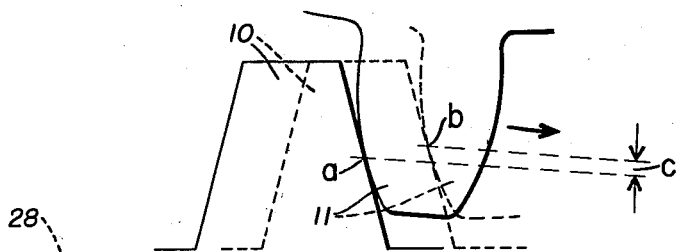
Fig 4
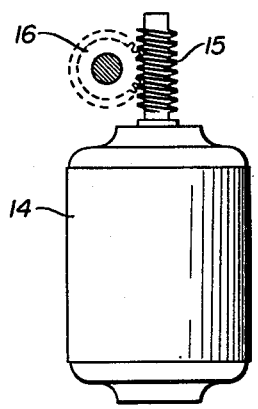
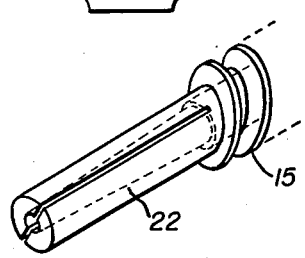
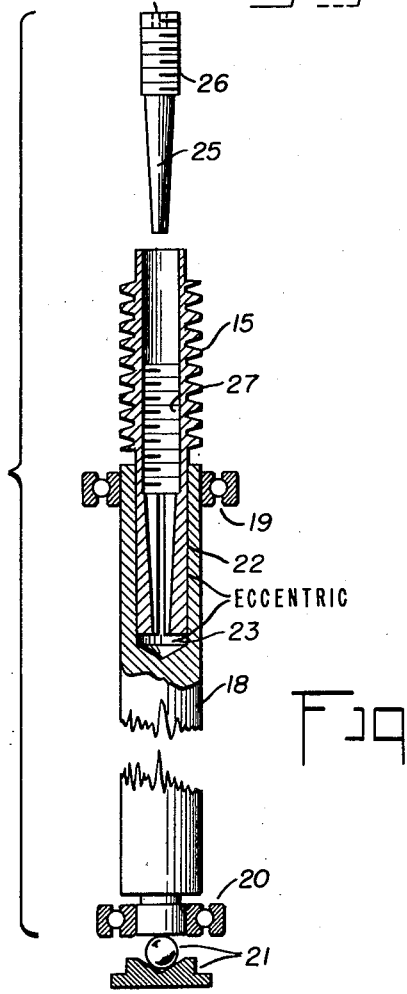
Fig 3
Fig 2
INVENTORS
JOHN R. SHONNARD
& HANS F. STEEN
BY
E. R. Evans
attorney Patented Aug. 26, 1952

2,608,103

UNITED STATES PATENT OFFICE 2,608,103

WORM GEAR DRIVE

John R. Shonnard, New York, and Hans F. Steen, Jamaica, N. Y., assignors to Times Facsimile Corporation, New York, N. Y., a corporation of New York Application January 28, 1949, Serial No. 73,276

9 Claims. (Cl. 74—396)

This invention relates to power drive gearing and more particularly, to worm gearing for facsimile machines, sound recorders and reproducers having a turntable, and other machines where smooth, constant-speed rotation of a driven member is essential.

Straight worm gearing has been commonly employed for obtaining large speed reduction between two shafts. The section of the worm thread is straight-sided, as in the case of an involute rack tooth. Hence the worm may be readily cut or hobbed with the required accuracy to obtain reasonably good efficiency. The force transmitted by the gearing produces end thrust on the worm, torsion and consequent bending of the worm and gear shafts, and a bending force radial to the worm tending to push the worm and worm gear apart. Excessive wear is usually caused by failure of lubrication resulting from high intensity of pressure between the teeth on the worm and gear sufficient to squeeze lubricant from the contacting surfaces, and this is aggravated by any irregularity in drive ratio because of the resulting contact pressure and displacement of the teeth by the torsional and bending forces.

Straight worm gearing, as used heretofore, has an inherent drive-ratio error, producing a pulsation or speed fluctuation in the driven member. In many cases, this speed variation is extremely undesirable, and torsional decouplers and fly-wheels have been used to reduce the angular speed fluctuations of the driven member. Such arrangements are complicated and only partially effective but in spite of these drawbacks are used to a great extent because of the importance of reducing the angular velocity variations as much as possible in certain machines. In general terms, the object of the present invention is to overcome these drawbacks and to provide worm gearing in which the change in drive ratio is minimized or completely eliminated in a simple and effective manner.

A further object of the invention is to provide an improved worm drive which has an inherently constant drive ratio, thus eliminating speed fluctuations without auxiliary stabilizing means, and decreasing wear.

A still further object of the invention is to provide improved means for imparting predetermined eccentric, orbital movement of the worm about its longitudinal rotative axis, preferably adjustable during assembly of the gear drive to obtain the desired corrective effect.

Other objects and advantages of the invention will become clear from the following description of the preferred embodiment thereof shown in the accompanying drawings, wherein Fig. 1 is an explanatory diagram of the operation of straight worm gearing where the axes of the worm and worm gear are fixed;

Fig. 2 is a sectional view of the drive shaft and worm in a drive embodying the invention;

Fig. 3 is a detail view of the slotted end of the worm; and

Fig. 4 is an assembly view of a typical worm drive according to the invention.

Referring to Fig. 1, the contacting teeth of the worm and worm gear of a straight worm drive are indicated at 10 and 11, respectively. As the driving worm rotates, the thread and gear tooth may be assumed to advance from the positions shown in full lines to that shown in dotted lines, if the rotational axes of the worm and gear are fixed. It will be noted that, as the worm rotates, the point of contact between the teeth changes from $a$ to $b$. Since the point $b$ is nearer to the axis of the worm gear, as represented by the distance $c$, and the profile of the tooth or thread 10 slopes at an angle to the radius of the worm gear extending to the contact point, it will be evident that the drive ratio between the worm and worm gear changes. As the rotation continues, before the tooth on the worm gear leaves the worm thread, the movement of the contact point reverses, thus causing an opposite change in drive ratio. Therefore if the worm is rotating at a uniform speed, a pulsation in speed is imparted to the worm gear as each tooth engages the worm thread. In accordance with the invention, this driving pulsation or angular velocity error of the (driven) worm gear is minimized by imparting a predetermined orbital movement to the worm about its own axis. While in the usual construction, the worm is the driving element, obviously the invention may also be employed where it is the driven element.

Referring to Figs. 2, 3 and 4, a typical worm gear reduction drive is illustrated in Fig. 4. The shaft of a motor 14 is shown as carrying or attached to a worm 15 engaging a worm gear 16 constituting the driven member. Instead of supporting the worm 15 for rotation on a fixed axis as in ordinary worm gearing, in accordance with the invention and as shown in detail in Figs. 2 and 3, the worm is eccentrically mounted on the motor shaft 18.

The shaft 18 is intended to represent any driving member or shaft supported for rotation about a fixed axis, as for example by the bearings 19 and 20 and an axial thrust bearing 21. While the drive shaft 18 rotates about a fixed axis, the worm 15 as previously stated, is supported for eccentric or orbital movement about the axis of said shaft. As shown by way of example, the worm 15 is provided with an eccentric extension or shank 22, parallel to the axis of the worm, which is mounted or fitted in an eccentric bore 23 in the end of the drive shaft 18. Preferably the eccentricity of the extension 22 and of the bore 23 may be substantially equal so that by rotating the shank in the bore, the eccentricity of the worm 15 with respect to the axis of the shaft 18 may be varied from substantially zero to a maximum value.

It will be understood that a predetermined amount of eccentricity as well as a definite axial position of the worm is required for optimum correction of the drive ratio error produced as described above in connection with the diagram in Fig. 1. To this end the worm may be adjustable in position. As shown it is hollow and the extension 22 slotted so that it can be wedged into tight clamping contact with the bore on the shaft 18 by means of a tapered pin 25, the upper end 26 of which is threaded for engagement with the threaded portion 27 of the worm 15. A socket 28 is also provided in the head of the taper pin 25 for an Allen-head or hexagonal-socket wrench. During assembly, the worm 15 is locked in position on the drive shaft 18 in various axial and angular positions by tightening the taper pin 25 until correction is obtained for the angular velocity error of the worm drive. It is found that by using suitable test or indicating equipment in connection with the driven member or gear 16, the angular velocity error of the worm drive may be quickly eliminated if the worm is adjusted in position by the trial and error method.

Since the construction described has proven effective to completely eliminate the spaced pulsations or variations of the driven gear, it is probable that the adjustment of the position of the worm is effective to take care of any errors in the rotational mountings for the worm and worm gear, such as variations in spacing between the centers of the shafts, as well as the inherent variations in the contact surfaces of the teeth as indicated in Fig. 1. Irrespective of the theory of operation of the improved construction, it has been found in actual practice that the angular velocity error of worm gearing of the character described can be corrected in a simple and effective manner. It appears to be necessary to provide for an eccentricity of the worm usually of less than about 1/60 of the pitch diameter of the worm itself, although the invention is not to be limited to any specific dimensions or proportions. As an example of a workable worm and gear, in accordance with the invention, a single-thread worm having an outside diameter of 0.31 inch, 13 threads per inch and a pitch diameter of 0.267 inch, for use with a 20-tooth worm gear having a pitch diameter of 0.5 inch, was cut with an eccentric shank 0.002 inch off center, thus providing a maximum eccentricity of 0.004 inch with respect to the axis of the motor shaft 18.

It will be seen that the invention provides an improved worm drive which is suitable for facsimile machines, sound reproducers and other machines in which even slight speed fluctuations of the driven member are undesirable. When the worm is properly mounted, a uniform drive ratio is obtained through the corrected driving engagement between the worm threads and gear teeth, thus reducing wear and vibration to a minimum. Since the worms and drive shafts may be made alike in quantity production, within the limits of ordinary shop tolerances, and any variations in the fit of the parts taken care of by the adjustable mounting of the worm, high precision workmanship is unnecessary. In addition, when a worm is worn out or damaged, it may be readily replaced without affecting the desired characteristics of the worm drive.

While a preferred embodiment of the invention has been described in detail in order to explain the underlying principles, various modifications in the construction and arrangement of parts will occur to those skilled in the art and may be made without departing from the scope of the invention.

We claim:

1. In worm gearing having uniform drive ratio, a single-thread worm meshing with the worm gear, a supporting shaft for said worm rotatably supported in fixed bearings, said worm being eccentric with respect to the axis of said shaft and means for securing said worm on said supporting shaft with the amount of eccentricity required for uniform drive ratio in all angular positions of the worm.

2. In gearing of the class described, in combination, a worm having a straight-sided thread, a worm gear meshing with said worm, means for adjusting the position of said worm in an axial direction and means for imparting a predetermined orbital movement of the worm around its longitudinal axis of rotation to maintain the drive ratio of the gear constant.

3. In gearing of the class described, in combination, a worm gear, a shaft mounted for rotation on a fixed axis, a worm on said shaft meshing with said worm gear, said shaft and worm having bore and shank portions respectively of the same diameter for mounting the worm on said shaft, said bore and shank portions being eccentric with respect to the axes of the worm and shaft, and means for adjustably locking the bore and shank portions of the worm and shaft together to provide desired eccentricity of the worm with respect to the fixed axis of said shaft.

4. In gearing of the class described, in combination, a worm gear, a rotatable worm meshing with said worm gear, a shaft for supporting said worm, said worm being eccentric with respect to the axis of said shaft, said shaft and worm having bore and shank portions of the same diameter for mounting the worm on the shaft, one of said portions being located to provide desired eccentricity of the worm, and means for securing the worm on said shaft.

5. In combination, a worm gear, a rotatable worm meshing with said gear, means including an eccentric mounting for said worm to impart adjustable orbital movement to the worm about its axis of rotation and frictional means for locking said eccentric mounting in position to provide desired eccentricity of the worm.

6. In combination, a worm gear, a worm meshing with said gear, said worm being provided with an eccentric slotted extension having an axial tapered bore, a shaft bored to receive said extension of the worm and a tapered pin in said tapered bore of the worm for spreading the slotted extension to clamp the worm to said shaft.

7. The combination recited in claim 6 in which the bore in said shaft is eccentric with respect to the axis of the shaft.

8. In combination, a worm gear, a rotatable worm, a rotatable shaft for said worm and frictional clamping means for securing said worm to said shaft with predetermined eccentricity between the axes of the worm and its shaft to correct the driving engagement of the worm with said worm gear.

9. In combination, a worm gear, a worm engaging said gear and a rotatable shaft for supporting said worm, said worm gear and shaft having fixed axes and said worm being adjustable in an axial direction with its central axis eccentric to the axis of the shaft, to correct the driving engagement between said worm and worm gear.

JOHN R. SHONNARD.
HANS F. STEEN.

REFERENCES CITED

The following references are of record in the file of this patent:

UNITED STATES PATENTS

| Number | Name | Date |
|---|---|---|
| 553,223 | Anderson | Jan. 21, 1896 |
| 892,923 | Winans | July 7, 1908 |
| 1,072,282 | Waninger | Sept. 2, 1913 |
| 1,718,196 | Replogle | June 18, 1929 |
| 2,455,842 | Weigel | Dec. 7, 1948 |
| 2,544,055 | Staats | Mar. 6, 1951 |